UNITED STATES PATENT OFFICE.

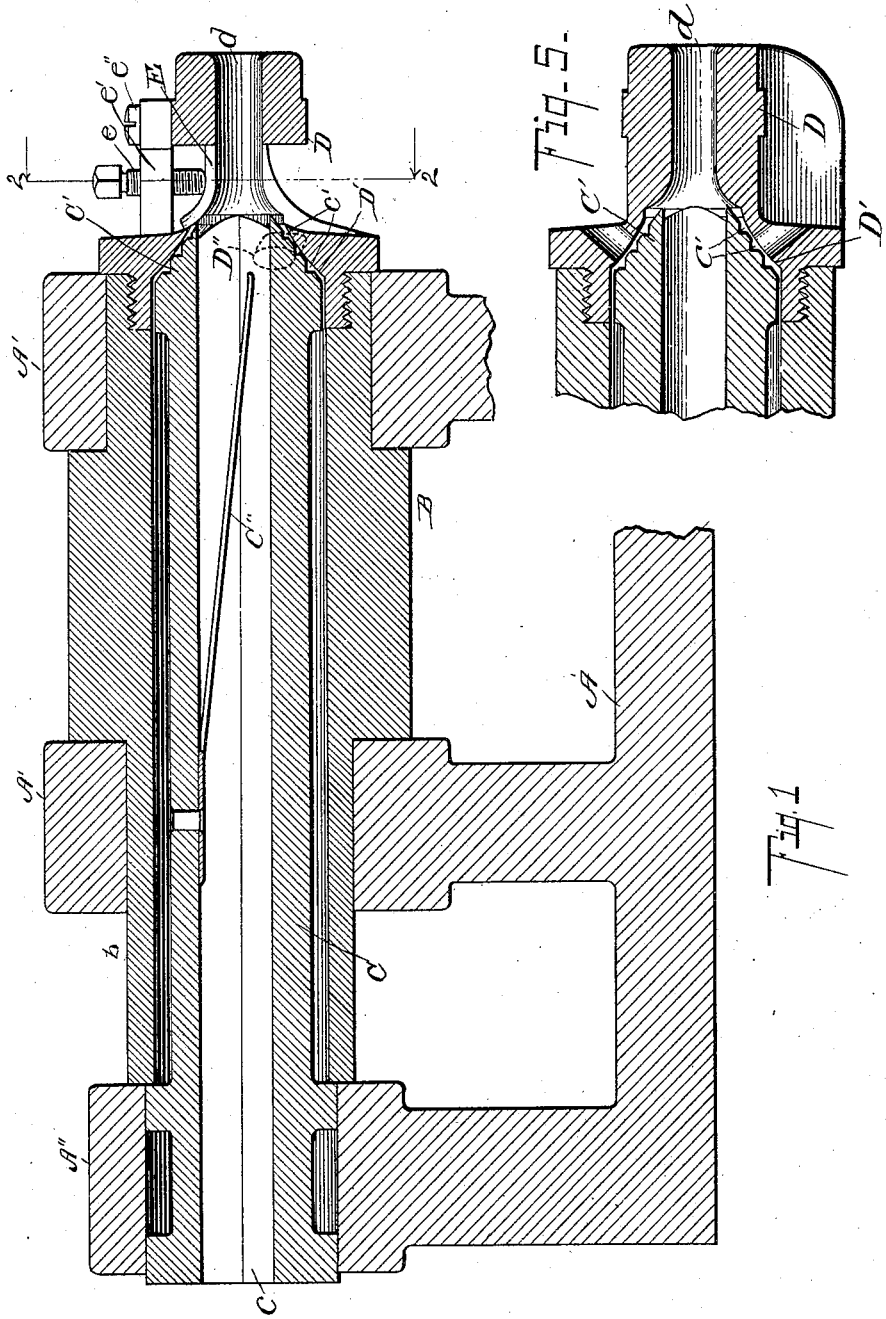

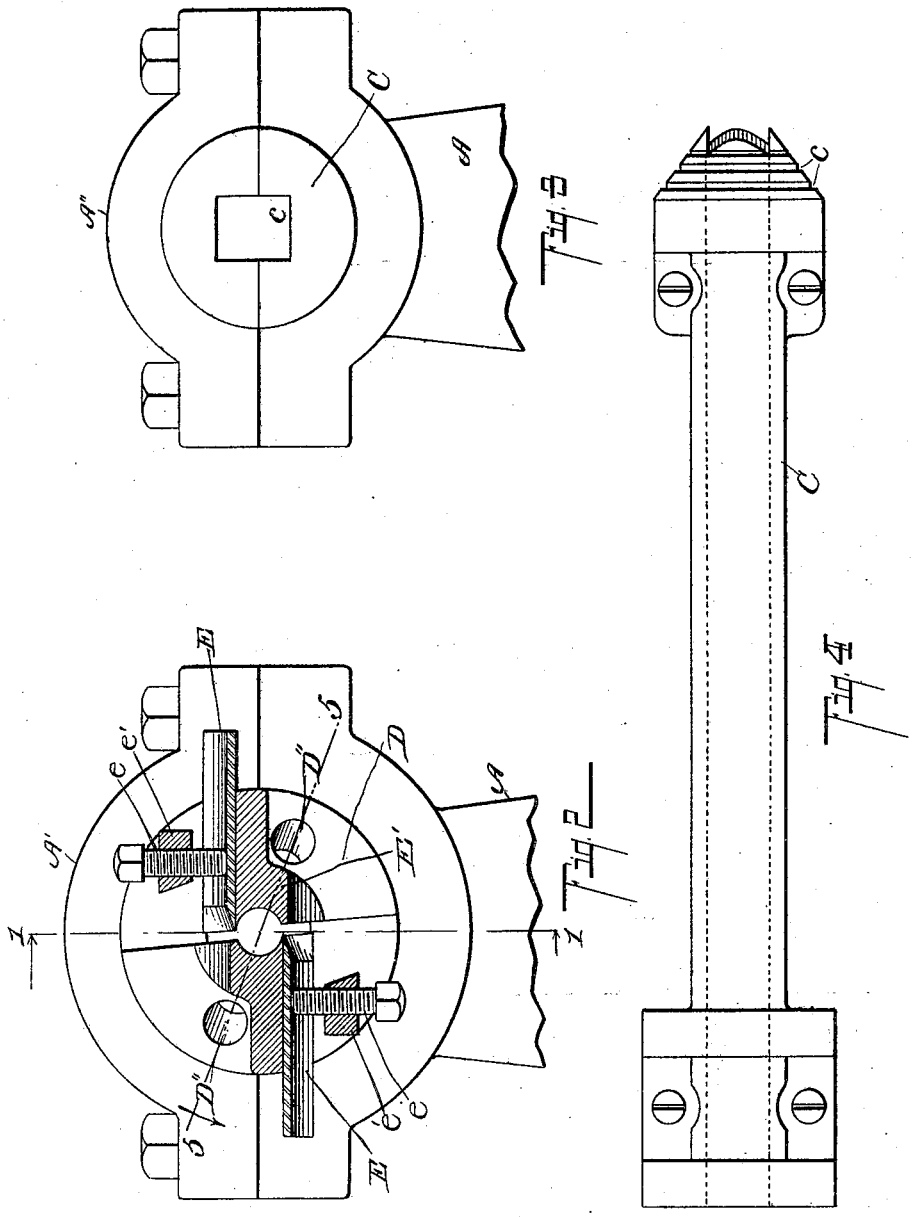

EDWARD TANNEWITZ, OF GRAND RAPIDS, MICHIGAN.

TURNING-LATHE.

No. 887,148.      Specification of Letters Patent.      Patented May 12, 1908.

Application filed May 14, 1906. Serial No. 316,770.

*To all whom it may concern:*

Be it known that I, EDWARD TANNEWITZ, a citizen of the United States, residing at Grand Rapids, county of Kent, State of Michigan, have invented certain new and useful Improvements in Turning-Lathes, of which the following is a specification.

This invention relates to improvements in turning lathes. It is related particularly to an improved turning lathe for turning round rods.

The objects of this invention are: First, to provide an improved turning lathe adapted to work upon strips of irregular or varying thickness. Second, to provide an improved turning lathe in which the work is guided and supported close to the cutters or knives. Third, to provide an improved turning lathe embodying the above advantages, which is not likely to become clogged. Fourth, to provide in a turning lathe an improved means for holding the cutters or knives.

Further objects, and objects relating to structural detail will definitely appear from the detailed description to follow.

I accomplish the object of my invention by the devices and means described in the following specification.

The invention is clearly defined and pointed out in the claims.

A structure embodying the features of my invention is clearly illustrated in the accompanying drawings, in which, Figure 1 is a longitudinal central section through the structure embodying the features of my invention, taken on a line corresponding to line 1—1 of Fig. 2. Fig. 2 is a transverse section through the cutter head taken on a line corresponding to line 2—2 of Fig. 1. Fig. 3 is a detail end elevation looking from the left into Fig. 1. Fig. 4 is a plan of the stock guide sleeve C.

In the drawings, the sectional views are taken looking in the direction of the little arrows at the ends of the section lines, and similar letters of reference refer to similar parts throughout the several views.

Referring to the drawings, A represents the frame portions of the machine on which are bearings A' A' for the arbor $b$ of the pulley B. This arbor $b$ is hollow and is interiorly threaded at its forward end to receive the cutter head D. The cutter head D is provided with a conical mouth or chamber D' in its inner end into which the conical end C' of the work guide sleeve C projects. The mouth D of the cutter head is extended or continued into a cylindrical work guide $d$. The work guide sleeve C is arranged through the hollow arbor $b$ and is supported at its outer end by the bracket A''. The stock opening or hole $c$ of the sleeve C is oblong in cross section. Within the sleeve $c$ is a blade spring C'', which is secured at its rear end to the wall of the sleeve and extends forwardly to the delivery end for holding the work to the bottom of the sleeve. This hole is so arranged in the sleeve relative to the work guide of the cutter head that, when the work is under pressure of the spring, it is properly centered relative to the work guide.

It is frequently the case that the stock is irregular or varies in thickness; this is especially the case when the stock is ripped from planks. My improved guiding sleeve accommodates stock of this character, and obviates the necessity of again running the same through the saw to remove the surplus material.

The conical end of the guide sleeve is provided with annular grooves $c'$. As the end of the sleeve fits close into the mouth of the chuck considerable dust from the knives passes up between the chuck and the sleeve. These grooves serve to collect the dust and also to prevent friction at this point. The dust is discharged through the openings D'' to cutter head, the inner edge of which openings terminates at the extreme circumference of the mouth of the cutter head and preferably embraces the last two grooves $c'$ in the end of the sleeve.

Owing to the high rate of speed at which the cutter head travels all the dust which finds its way between the cutter head and the sleeve is thrown out by centrifugal force through the holes D''.

The knives E are held by set screws $e$ upon the rests E' provided therefor. The set screws $e$ are arranged through the arms $e'$ secured upon the cutter head by the screws $e''$; see Figs. 1 and 2.

It is a common practice in cutter heads of this kind to provide the knives with longitudinal slots and to secure them with screws or bolts arranged through the slots. The frequent grinding required soon wears the knives up to the slots; then of course they are useless.

By securing the knives as I have illustrated, they can be used up to very small pieces, it only being necessary to have the same of sufficient length to be engaged by the set screws.

The arms $e'$ are preferably formed separately from the cutter head proper, which is cast, and secured thereto by said screws $e''$, as illustrated. This enables the use of steel for these arms and also simplifies the casting, and these arms possess greater strength than would otherwise be secured.

The stock is held and supported by the sleeve practically to the point where it is acted upon by the knives so that it is not likely to be twisted off although it may be of small diameter. This enables the working up of cross grain "trash," or shaky stock and also of short pieces.

My improved turning lathe is very simple in structure and at the same time is very effective for the purpose intended. I have illustrated the same in detail in the form preferred by me, but I am aware that it is capable of considerable variation in structural detail without departing from my invention.

Having thus described my invention, what I claim as new and desire to secure by Letters Patent is:

1. The combination of a revolubly mounted cutter head having a conical chamber or mouth at its inner end extended or continued into a cylindrical work guide, said cutter head having dust discharge openings therethrough opening into said mouth; a stock or work guide sleeve having a conical end with annular grooves therein arranged in the conical mouth of said cutter head for the purpose specified.

2. The combination of a revolubly mounted cutter head having a conical chamber or mouth at its inner end extended or continued into a cylindrical work guide, said cutter head having dust discharge openings therethrough opening into said mouth; a stock or work guide sleeve having a conical end arranged in the conical mouth of said cutter head, for the purpose specified.

3. The combination of a revolubly mounted cutter head having a conical mouth, said cutter head having dust discharge openings therethrough opening into said mouth; and a stock or work guide having a conical end arranged in the conical mouth of said cutter head, for the purpose specified.

In witness whereof, I have hereunto set my hand and seal in the presence of two witnesses.

EDWARD TANNEWITZ. [L. S.]

Witnesses:
M. A. ADRION,
C. E. TANNEWITZ.